US011807737B1

(12) United States Patent
Smith et al.

(10) Patent No.: US 11,807,737 B1
(45) Date of Patent: Nov. 7, 2023

(54) GEL COMPOSITION COMPRISING A PHASE-CHANGE MATERIAL

(71) Applicant: Cold Chain Technologies, LLC, Franklin, MA (US)

(72) Inventors: Dawn E. Smith, Hopkinton, MA (US); Juan Lopez, III, Providence, RI (US); John Newport, Chadds Ford, PA (US)

(73) Assignee: COLD CHAIN TECHNOLOGIES, LLC, Franklin, MA (US)

(*) Notice: Subject to any disclaimer, the term of this patent is extended or adjusted under 35 U.S.C. 154(b) by 571 days.

(21) Appl. No.: 16/827,086

(22) Filed: Mar. 23, 2020

Related U.S. Application Data

(60) Provisional application No. 62/824,767, filed on Mar. 27, 2019.

(51) Int. Cl.
| | |
|---|---|
| *C08K 5/00* | (2006.01) |
| *C08K 3/38* | (2006.01) |
| *C08L 5/00* | (2006.01) |
| *F25D 3/06* | (2006.01) |

(52) U.S. Cl.
CPC ............... *C08K 5/0025* (2013.01); *C08K 3/38* (2013.01); *C08L 5/00* (2013.01); *F25D 3/06* (2013.01); *C08K 2003/387* (2013.01); *F25D 2303/085* (2013.01)

(58) Field of Classification Search
None
See application file for complete search history.

(56) References Cited

U.S. PATENT DOCUMENTS

| | | | | |
|---|---|---|---|---|
| 2,979,463 | A * | 4/1961 | Ferguson | C09K 5/066 252/70 |
| 3,903,011 | A * | 9/1975 | Donnelly | F24V 30/00 516/107 |
| 4,336,145 | A * | 6/1982 | Briscoe | C09K 8/76 516/107 |
| 5,372,732 | A * | 12/1994 | Harris et al. | C08L 5/14 507/903 |
| 6,447,803 | B1 | 9/2002 | Sorrentino et al. | |

(Continued)

OTHER PUBLICATIONS

Sales literature for KOOLIT refrigerants, Cold Chain Technologies, Franklin, MA (2021); https://www.coldchaintech.com/product-details/gel-packs/.

Jacoby, "Setting the record straight on slime," Chemical and Engineering News, pages 26-27 (Jul. 9, 2018).

(Continued)

*Primary Examiner* — Joseph D Anthony
(74) *Attorney, Agent, or Firm* — KRIEGSMAN & KRIEGSMAN

(57) ABSTRACT

A gel composition possessing good cohesive properties. In one embodiment, the gel composition includes a phase-change material. The phase-change material is preferably an aqueous salt solution. The gel composition also includes a cross-linkable thickener. The cross-linkable thickener preferably is compatible with an aqueous salt solution and preferably includes one or more cross-linkable hydroxyl groups. The gel composition additionally includes a boron-containing cross-linker that is present in an amount that is sufficient to gel the formulation. The weight ratio in the gel composition of boron to thickener is preferably in the range of about 1:250 to 1:50. When packaged in a container, the gel composition resists flowing when the container is torn or punctured. The present invention is also directed at a method of preparing the gel composition, at a thermal exchange implement including the gel composition, and at methods of preparing and using the thermal exchange implement.

22 Claims, 1 Drawing Sheet

(56) References Cited

U.S. PATENT DOCUMENTS

| | | | |
|---|---|---|---|
| 6,482,332 | B1 | 11/2002 | Malach |
| 9,267,722 | B2 | 2/2016 | Blezard et al. |
| 9,556,373 | B2 | 1/2017 | Formato et al. |
| 9,598,622 | B2 | 3/2017 | Formato et al. |
| 10,077,389 | B2 | 9/2018 | Formato et al. |
| 10,288,337 | B2 | 5/2019 | Blezard et al. |
| 10,422,565 | B2 | 9/2019 | Blezard et al. |
| 10,829,675 | B2 | 11/2020 | Formato et al. |
| 10,989,460 | B2 | 4/2021 | Blezard et al. |
| 2016/0068737 | A1* | 3/2016 | Lahalih .............. C09K 8/512 507/230 |
| 2016/0319187 | A1* | 11/2016 | Lawrence et al. ....... C09K 8/90 |
| 2017/0319437 | A9* | 11/2017 | Zelikman et al. .... A61K 31/167 |
| 2018/0093816 | A1 | 4/2018 | Longley et al. |
| 2019/0085226 | A1 | 3/2019 | Formato et al. |
| 2021/0239380 | A1 | 8/2021 | Blezard et al. |
| 2021/0292630 | A1 | 9/2021 | Formato et al. |

OTHER PUBLICATIONS

Oró et al., "Review on phase change materials (PCMs) for cold thermal energy storage applications," Applied Energy, 99:513-533 (2012).

Printout of https://www.aqua-calc.com/page/density-table/substance/premium-blank-guar-blank-gum-coma-and-blank-upc-column-blank-039978025548; accessed Feb. 26, 2023.

Printout of https://www.coldchaintech.com/product-details/gel-packs/; Cold Chain Technologies, LLC, Franklin, MA, accessed Feb. 26, 2023.

Printout of https://www.thermosafe.com/products/refrigerants/gel-packs/; Sonoco Thermosafe, Arlington Heights, IL, accessed Feb. 26, 2023.

Sales literature for ThermoSafe U-tek 599 Phase Change Material Gel, -23°C Temperature, 9.375" L x 7.75" W x 1" H (Case of 8), available from Amazon.com (2022); https://www.amazon.com/ThermoSafe-599-Change-Material-Temperature/dp/B00C2T5AXO.

Technical Bulletin entitled "Conversion Factors," 20 Mule Team BORAX Rio Tinto, borax.com, Boron, CA (2018).

U.S. Appl. No. 17/180,771, inventor William Blezard, filed Feb. 20, 2021.

U.S. Appl. No. 17/180,774, inventor William Blezard, filed Feb. 20, 2021.

* cited by examiner

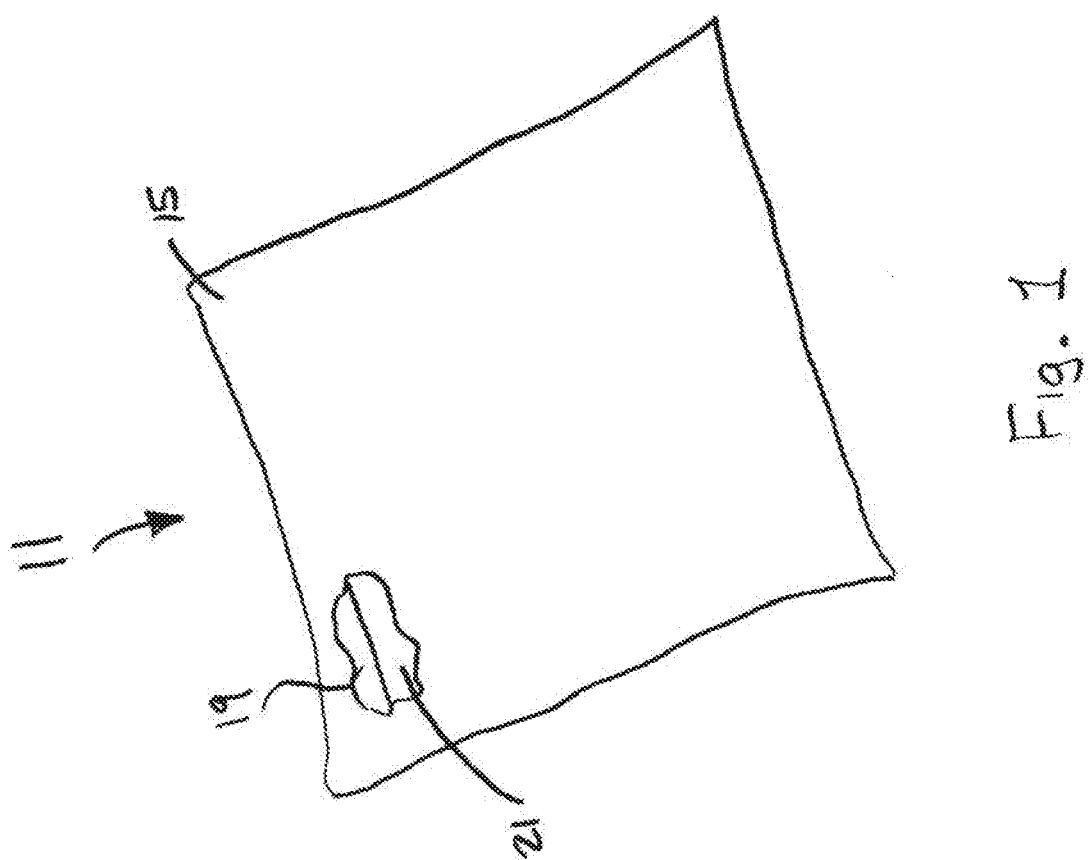

GEL COMPOSITION COMPRISING A PHASE-CHANGE MATERIAL

CROSS-REFERENCE TO RELATED APPLICATIONS

The present application claims the benefit under 35 U.S.C. 119(e) of U.S. Provisional Pat. Application No. 62/824,767, inventors Dawn E. Smith et al., filed Mar. 27, 2019, the disclosure of which is incorporated herein by reference.

BACKGROUND OF THE INVENTION

The present invention relates generally to phase-change materials and relates more particularly to gel compositions comprising one or more phase-change materials.

There is a continuing need for systems that can keep products at desired temperatures (e.g., frozen, refrigerated, room temperature, etc.) during transportation and/or storage. One way of meeting this need is through the use of passive temperature-control members, such as, but not limited to, ice packs, gel packs, and the like. Such passive temperature-control members typically comprise a quantity of a phase-change material (PCM) disposed within a suitable container. Typically, in use, one or more such passive temperature-control members are pre-conditioned at a desired temperature and then are positioned within an insulated container along with a product payload.

Many different types of passive temperature-control members exist, some types comprising an organic phase-change material and some other types comprising an aqueous phase-change material. An example of a passive temperature-control member comprising an organic phase-change material is disclosed in U.S. Pat. No. 10,077,389 B2, inventors Formato et al., which issued Sep. 18, 2018, and which is incorporated herein by reference. In the aforementioned patent, there is disclosed a gel including a phase-change material and a gelling agent. In one embodiment, the phase-change material may be n-tetradecane, n-hexadecane or mixtures thereof. The gelling agent may be a high molecular weight styrene-ethylene-butylene-styrene (SEBS) triblock copolymer with a styrene:rubber ratio of about 30:70 to 33:67% by weight. To form the gel, the phase-change material and the gelling agent may be mixed at an elevated temperature relative to room temperature to partially, but not completely, dissolve the gelling agent. The mixture may then be cooled to room temperature. Alternatively, the phase-change material and the gelling agent may be mixed at room temperature, and the mixture may then be heated to form a viscoelastic liquid, which is then cooled to room temperature. The invention is also directed at a method of preparing the gel, a thermal exchange implement including the gel, and a method of preparing the thermal exchange implement.

One of the simplest examples of a passive temperature-control member of the type comprising an aqueous phase-change material is a pack consisting of a quantity of water packaged inside a film pouch or bottle. To provide some support to a water-containing pack comprising a flexible film pouch, a stiffening member, such as a foam brick, pad or mat, is sometimes disposed within the pouch.

Alternatively, in some cases, a thickener is used in such water-containing packs to form a gel-like composition. There are a wide variety of water-soluble thickeners, both natural and synthetic, including common materials like hydroxyethyl cellulose (HEC), carboxymethylcellulose (CMC) and sodium polyacrylate. However, unless a very high concentration of thickener is used, the contents will readily flow out of a torn or punctured gel pack. Such tears or punctures may be due to defects in the film pouch present at the time of manufacture or may be due to damage caused during transit. As can be appreciated, the mechanical stresses of transportation can result in tearing or puncture of the gel pack, especially when it has been exposed to low temperatures and/or by repeated temperature cycling. If the gel pack is torn or punctured, and leakage of the gelled composition occurs, this may damage the product payload.

Unfortunately, although many thickeners are water-soluble, a number of such thickeners are incompatible with aqueous salt solutions, making them unsuitable for use as thickeners for gel packs with sub-zero phase-change temperatures. Thus, there is a need for a shape-stable phase-change composition comprising an aqueous salt solution that can be encased in a plastic film pouch without risk of leakage during use.

Additional documents that may be of interest may include the following, all of which are incorporated herein by reference: U.S. Pat. No. 9,598,622 B2, inventors Formato et al., which issued Mar. 21, 2017; U.S. Pat. No. 9,556,373 B2, inventors Formato et al., which issued Jan. 31, 2017; U.S. Pat. No. 6,482,332 B1, inventor Malach, which issued Nov. 19, 2002; U.S. Pat. No. 6,447,803 B1, inventors Sorrentino et al., which issued Sep. 10, 2002; U.S. Pat. 5,372,732, inventors Harris et al., which issued Dec. 13, 1994; Jacoby, "Setting the record straight on slime," *Chemical and Engineering News*, pages 26-27 (Jul. 9, 2018); and Oró et al., "Review on phase change materials (PCMs) for cold thermal energy storage applications," *Applied Energy*, 99:513-533 (2012).

SUMMARY OF THE INVENTION

It is an object of the present invention to provide a novel gel composition comprising a phase-change material.

Therefore, according to one aspect of the invention, there is provided a gel composition, the gel composition comprising (a) a phase-change material, wherein the phase-change material comprises an aqueous salt solution; (b) a cross-linkable thickener, wherein the cross-linkable thickener is compatible with the phase-change material and wherein the cross-linkable thickener comprises one or more cross-linkable hydroxyl groups; and (c) a cross-linker for the one or more cross-linkable hydroxyl groups, wherein the cross-linker comprises a boron-containing cross-linker and wherein a weight ratio of boron in the gel composition to the cross-linkable thickener in the gel composition is in the range of about 1:250 to 1:50.

In a more detailed feature of the invention, the aqueous salt solution may comprise at least one of sodium chloride, potassium chloride, and calcium chloride.

In a more detailed feature of the invention, the aqueous salt solution may be an aqueous sodium chloride solution.

In a more detailed feature of the invention, the aqueous salt solution may constitute at least 90% by weight of the gel composition.

In a more detailed feature of the invention, the aqueous salt solution may constitute at least 95% by weight of the gel composition.

In a more detailed feature of the invention, the aqueous salt solution may constitute at least 97% by weight of the gel composition.

In a more detailed feature of the invention, the cross-linkable thickener may comprise a polysaccharide.

In a more detailed feature of the invention, the cross-linkable thickener may comprise a galactomannan.

In a more detailed feature of the invention, the galactomannan may comprise at least one of the group consisting of fenugreek gum, guar gum, tara gum, locust bean gum, and cassia gum.

In a more detailed feature of the invention, the galactomannan may comprise at least one member of the group consisting of guar gum and locust bean gum.

In a more detailed feature of the invention, the galactomannan may comprise guar gum.

In a more detailed feature of the invention, the galactomannan may comprise locust bean gum.

In a more detailed feature of the invention, the cross-linkable thickener may further comprise xanthan gum.

In a more detailed feature of the invention, the boron-containing cross-linker may comprise sodium borate.

In a more detailed feature of the invention, the weight ratio of boron in the gel composition to the cross-linkable thickener in the gel composition may be in the range of about 1:200 to 1:100.

In a more detailed feature of the invention, the weight ratio of boron in the gel composition to the cross-linkable thickener in the gel composition may be in the range of about 1:175 to 1:120.

According to another aspect of the invention, there is provided a gel composition, the gel composition comprising (a) a phase-change material, wherein the phase-change material comprises an aqueous salt solution; (b) a cross-linkable thickener, wherein the cross-linkable thickener is compatible with the phase-change material, wherein the cross-linkable thickener comprises one or more cross-linkable hydroxyl groups, and wherein the cross-linkable thickener constitutes about 1-2.5 wt% of the gel composition; and (c) a cross-linker for the one or more cross-linkable hydroxyl groups, wherein the cross-linker comprises a boron-containing cross-linker and wherein boron constitutes about 40 to 200 ppm, by weight, of the gel composition.

In a more detailed feature of the invention, boron may constitute about 50 to 170 ppm, by weight, of the gel composition.

In a more detailed feature of the invention, boron may constitute about 55 to 85 ppm, by weight, of the gel composition.

In a more detailed feature of the invention, the cross-linkable thickener may comprise a polysaccharide.

In a more detailed feature of the invention, the cross-linkable thickener may comprise a galactomannan.

In a more detailed feature of the invention, the galactomannan may comprise at least one of the group consisting of fenugreek gum, guar gum, tara gum, locust bean gum, and cassia gum.

In a more detailed feature of the invention, the galactomannan may comprise at least one member of the group consisting of guar gum and locust bean gum.

In a more detailed feature of the invention, the galactomannan may comprise guar gum.

In a more detailed feature of the invention, the galactomannan may comprise locust bean gum.

In a more detailed feature of the invention, the cross-linkable thickener may further comprise xanthan gum.

In a more detailed feature of the invention, the boron-containing cross-linker may comprise sodium borate.

The present invention is also directed at a method of preparing the gel composition, at a thermal exchange implement comprising the gel composition, and at methods of preparing and using the thermal exchange implement. For example, according to one aspect of the invention, a thermal exchange implement is provided, the thermal exchange implement comprising (a) a thermal exchange implement container; and (b) a quantity of the above-described gel composition disposed within the thermal exchange implement container.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawing, which is hereby incorporated into and constitutes a part of this specification, illustrates an embodiment of the invention and, together with the description, serves to explain the principles of the invention. This drawing is not necessarily drawn to scale, and certain components may have undersized and/or oversized dimensions for purposes of explication. In the drawing wherein like reference numerals represent like parts:

FIG. 1 is a front view, broken away in part, of one embodiment of a thermal exchange implement for use in maintaining a temperature-sensitive material within a desired temperature range, the thermal exchange implement being constructed according to the teachings of the present invention.

DETAILED DESCRIPTION OF THE INVENTION

The present invention is specifically concerned with phase-change material (PCMs) compositions that contain water and dissolved salts, such as sodium chloride or calcium chloride, also called eutectic solutions. It can be particularly challenging to thicken salt solutions since many thickeners are ineffective, or considerably less effective, in the presence of electrolytes. Guar gum is known to be an exemplary thickener of water and salt solutions. However, thickener when used alone must be added at high concentrations and does not provide a truly leak-free product. To address the cost and reduction in performance associated with high concentrations of thickener, gelling agent has been utilized. Sodium borate is known to be a good cross-linking agent when used with polysaccharides such as guar gum, even at relative low concentrations of guar gum. However, as discussed further below, existing gel compositions comprising PCM tend to flow easily from a torn or punctured pouch and, thus, make their clean-up difficult.

Accordingly, the present invention is directed, in part, at a novel gel composition that overcomes at least some of the disadvantages associated with existing gel compositions that comprise PCM. The gel composition of the present invention may comprise the following components or ingredients: (i) a phase-change material (PCM); (ii) a cross-linkable thickener; and (iii) a cross-linker, wherein the cross-linker or the combination of the cross-linkable thickener and the cross-linker are selected to endow the present gel composition with desirable properties. Each of the aforementioned components is discussed below in greater detail.

The phase-change material component of the present gel composition may be water-based and, in particular, may comprise an aqueous salt solution. One or more types of salts (e.g., sodium chloride, potassium chloride, calcium chloride, etc.) may be used in the aqueous salt solution, and the type and amount of salt in the aqueous salt solution may be selected to provide a desired phase-change temperature. A number of exemplary aqueous salt solutions are disclosed in Oró et al., "Review on phase change materials (PCMs) for cold thermal energy storage applications," *Applied Energy*, 99:513-533 (2012), such salt solutions including, but not being limited to, an aqueous solution of sodium chloride (23.3 wt% NaCl) having a phase-change temperature of about -21° C., an aqueous solution of potassium chloride (19.7 wt% KCl) having a phase-change temperature of about -10° C., and an aqueous solution of calcium chloride (30.5 wt% $CaCl_2$) having a phase-change temperature of -50° C.

Preferably, the phase-change material component constitutes a very high percentage, by weight, of the total gel composition. For example, the phase-change material component may constitute at least 90%, by weight, of the total gel composition, preferably at least 95%, by weight, of the total gel composition, and even more preferably at least 97%, by weight, of the total gel composition. In fact, in some cases, the phase-change material component may constitute up to about 99%, by weight, of the total gel composition.

The cross-linkable thickener component of the present gel composition preferably comprises a cross-linkable thickener that is compatible with an aqueous salt solution. (Many thickeners are ineffective, or considerably less effective, in the presence of electrolytes.) According to one embodiment, the aforementioned cross-linkable thickener may comprise one or more cross-linkable hydroxyl groups. Examples of such thickeners may comprise polysaccharide polymers that retain their ability to thicken water despite the presence of a high concentration of salts.

According to one embodiment, such thickeners may include, but are not limited to, the galactomannans. Galactomannans are polysaccharides that consist of a mannose backbone with galactose side groups. More specifically, the galactomannans consist of a (1-4)-linked beta-D-mannopyranose backbone with branchpoints from their 6-positions linked to alpha-D-galactose (i.e., 1-6-linked alpha-D-galactopyranose). The galactomannans include, in order of an increasing mannose-to-galactose ratio, fenugreek gum (with a mannose:galactose ratio of about 1:1), guar gum (with a mannose:galactose ratio of about 2:1), tara gum (with a mannose:galactose ratio of about 3:1), locust bean gum or carob gum (with a mannose:galactose ratio of about 4:1), and cassia gum (with a mannose:galactose ratio of about 5:1).

Of the foregoing galactomannans, guar gum may be particularly well-suited for use in the present gel composition. This is due, in part, to its excellent properties in the present gel composition, as well as to its being low in cost and readily available. Locust bean gum has also showed good results and may also be particularly well-suited for use in the present gel composition.

According to another embodiment, another polysaccharide thickener that may be used in the present gel composition may be xanthan gum. Xantham gum is made up of pentasaccharide repeat units comprising glucose, mannose, and glucuronic acid in the molar ratio of 2:2:1, respectively. Although xantham gum is not as preferred as guar gum and locust gum as a sole thickener in the present gel composition, combinations of xantham gum and guar gum and/or xanthan gum and locust gum may be desirable.

Preferably, the thickeners of the present gel composition are fully soluble in the present gel composition without heating. However, alternatively, in another embodiment, there may be other thickeners that are soluble only if they are heated. Such thickeners may be used in the present gel composition; however, as can readily be appreciated, such heating would add cost to the manufacturing process.

The cross-linker component of the present gel composition preferably comprises a boron-containing cross-linker that is preferably present in an amount that is sufficient to gel the formulation. An example of the boron-containing cross-linker may be sodium borate, which is also known as borax.

As will be discussed further below, one of the novel features of the present gel composition relates to the amount of boron-containing cross-linker that is present in the gel composition and, in particular, relates to the relative amounts of thickener and boron-containing cross-linker that are present in the gel composition. More specifically, as far as the present inventors are aware, existing commercially-available gel compositions comprising PCM contain, on average, about 30 ppm of boron, by weight, of the total gel composition and contain, on average, about 1 to 2.5% of thickener, by weight, of the total gel composition. Accordingly, such gel compositions have a weight ratio of boron to thickener in the range of about 1:600 to 1:400. By comparison, the present gel composition contains at least 41 ppm of boron. At 55 ppm boron, excellent gel properties are achieved. The very best gel properties were achieved with guar gum and 83 ppm boron. Based on our examples, the invention may be expressed as having boron to thickener ratios ranging from about 1:250 to 1:50, preferably about 1:200 to 1:100, more preferably about 1:175 to 1:120.

Referring now to FIG. 1, there is shown a front view, broken away in part, of one embodiment of a thermal exchange implement for use in maintaining a temperature-sensitive material within a desired temperature range, the thermal exchange implement being constructed according to the teachings of the present invention and being represented generally by reference numeral 11.

Thermal exchange implement 11 may comprise a sealed pouch 15. Pouch 15, which may be a flexible pouch identical or similar to that described in U.S. Pat. No. 10,077,389, may be shaped to define an interior cavity 19. A quantity of a gel 21, which may be, for example, the present gel composition, may be disposed within cavity 19.

Thermal exchange implement 11 may be used similarly to a conventional ice/cold pack to keep temperature-sensitive materials within a desired temperature range.

Although the present gel composition is shown in FIG. 1 as being contained within a flexible pouch, it is to be understood that the present gel composition may be contained within containers other than a flexible pouch of the type shown in FIG. 1. For example, but without limitation, the present gel composition may be contained within a bottle-like structure of the type shown in the FIGURE of U.S. Pat. No. 10,077,389 or may be contained within a mat-like structure of the type shown in the FIGURE of U.S. Pat. Application Publication No. US 2018/0093816 A1, inventors Longley et al., which was published Apr. 5, 2018, and which is incorporated herein by reference.

The following examples are provided for illustrative purposes only and are in no way intended to limit the scope of the present invention:

Example 1: Compositional Analysis of Commercially-Available Gels

Two examples of commercially-available PCM "gels" were obtained as refrigerant pouches. In both cases, the PCM gel comprised water, salt, thickener, and boron-containing crosslinking agent as shown in Table I below. Despite being described as gels, both products exhibited undesirable leakage when the pouches were punctured.

Item No. 1: ThermoSafe U-TEK® 599 Phase Change Material Gel, -23° C. Temperature (obtained from Amazon.com.).

Item No. 2: KOOLIT® 524-ST Suppressed Temperature PCM gel pack (-23° C. phase change), manufacture date of 01-January-2018 (obtained from Cold Chain Technologies, Inc., Franklin, MA, USA).

Example 2: Corrugate Contact Test Method

This test was developed for the purpose of assessing the PCM gels for their suitability for use in applications where the gel pouch may be punctured or torn, or there may be a spill. The test surface selected was corrugated cardboard since this substrate is frequently used in shipping containers, and it is a material that may quickly absorb liquid spills and lose robustness.

Approximately 10 grams of the test sample was applied to a piece of clean corrugate at least 6 inches by 10 inches in size. A spatula was used to spread the material manually for approximately 30 seconds. The physical appearance was assessed qualitatively: for example, by describing the sample as a viscous liquid, soft gel, elastic gel, or brittle gel. An attempt was made to remove the material by lifting it in one piece or several pieces. If unsuccessful, the spatula was used to clean up the material as effectively as possible within about 30 seconds. After 30 seconds, the corrugate was examined visually for the presence of residual sample or

TABLE I

| Gel | Total Solids Content, Measured[1] | Sodium Content, Measured[2] | Sodium Chloride, Calculated[3] | Boron Content, Measured[4] | Total Thickener Content, Calculated[5] | Guar Gum Content, Measured[6] | Weight Ratio of Boron: Thickener |
|---|---|---|---|---|---|---|---|
| U-TEK 599 | 15.62% | 51744 ppm | 13.15% | 43 ppm | 2.47% | 14.73 g/L | 1 : 574 |
| KOOLIT 524-ST | 18.64% | 69113 ppm | 17.57% | 26 ppm | 1.07% | 7.12 g/L | 1 : 412 |

Analysis Details

[1]Total Solids Content: Samples of about 2 grams were weighed into 15 mL conical tubes. The samples were then frozen in liquid nitrogen, and the water was removed by lyophilization for 48 hours. The remaining sample was weighed, and the percent solids determined.

[2]Sodium Content: Samples were digested using nitric acid/hydrogen peroxide with heat, then diluted by a factor of 500 with water, and then analyzed using an Agilent 7500 series ICP/MS. The instrument was calibrated with certified standards.

[3]Sodium Chloride Content: Using a value of 22.99 for the atomic mass of sodium and a value of 35.45 for the atomic mass of chlorine, the weight percentage of sodium chloride was calculated from the measured sodium content.

[4]Boron content: Analysis was performed by two labs, with the average result being reported.

Lab 1: 1.0 gram of sample was digested using 100 mL of 50/50 nitric acid/hydrogen peroxide with heat (95° C. for 10-15 minutes), then diluted by a factor of 5 with water and analyzed using an Agilent 7500 series ICP/MS. The instrument was calibrated with a certified standard of boron.

Lab 2: Boron analysis was performed using a Perkin Elmer Nexion 350X inductively coupled plasma mass spectrometer, calibrated before use.

[5]Total Thickener Content: Value was estimated by subtracting the Sodium Chloride Content from the Total Solids Content.

[6]Guar Gum Content: After first confirming by $^1$H and $^{13}$C NMR that guar gum was present in both samples, a commercially available galactomannan assay was used to quantify the amount of galactose present after treatment with beta-mannanase; consequently, the amount of galactomannan was calculated.

staining. The test sample was assigned a value from 1-5 based on the following criteria in Table II:

TABLE II

| | |
|---|---|
| 5 | Did not flow. Easy to remove in one piece or several pieces. No residue. No stain. |
| 4 | Did not flow. Easy to remove in one piece or several pieces. Low residue and/or minimal stain. |
| 3 | Minimal flow. Easy to remove. Low residue and/or minimal stain. |
| 2 | Flows readily. A spatula was required for removal. Residue and/or stain. |
| 1 | Flows readily. Removal was difficult even with a spatula. Significant residue and stain. |

Both samples of the commercially-available PCM gels showed undesirable characteristics. In the corrugate contact test, U-TEK® 599 had the physical appearance of a viscous, slightly elastic liquid. It was assigned a rating of 2. KOOLIT® 524-ST had the physical appearance of a viscous, slightly elastic liquid. It was assigned a rating of 1.

Example 3: Preparation and Analysis of New Formulations

Several new formulations were prepared and then analyzed. Formulation Nos. 1, 2, 6, 7, and 9 represent comparative formulations whereas Formulation Nos. 3-5, 8 and 10-13 represent examples of the present gel composition.

Raw Materials

Sodium chloride TX-10 food grade was obtained from US Salt LLC, Watkins Glen, NY.

Guar gum, manufactured by Bulk Supplements, was obtained from amazon.com.

Xanthan gum, manufactured by Namaste Foods, LLC, was obtained from amazon.com.

Locust bean gum was obtained from Modernist Pantry, LLC, Eliot, ME.

Sodium borate decahydrate, technical grade of CAS number 1303-96-4, was obtained from PTI Process Chemicals and used as a 2.5 wt% solution in tap water. Sodium borate decahydrate, also known as borax, has the formula $Na_2B_4O_7 \cdot 10H_2O$ and molar mass 381.4 g/mol. The boron content of this solution was calculated as 0.28%, based on a boron molar mass of 10.8 g/mol.

Formulation No. 1 (20% NaCl, 1% Guar Gum)

An amount of 6.0 g of guar gum was slowly added into 600.0 g of 20 wt% NaCl solution, using an IKA RW-20 digital overhead mixer with a 4-inch propeller mixing blade set at 300-350 rpm. A Cuisinart "Smart Stick" two-speed immersion blender was used briefly at the high setting to disperse dumpy material. The resulting formulation was allowed to equilibrate and for bubbles to disperse for at least 48 hours before testing.

Formulation No. 2 (20% NaCl, 1% Guar Gum, 250 Ppm Sodium Borate)

An amount of 1.0 g of a solution containing 2.5 wt% sodium borate in water was added to 100 g of Formulation No. 1. The resulting sample was hand-mixed with a spatula for at least 30 seconds and allowed to equilibrate for 48 hours before testing of the resulting formulation. The amount of sodium borate in the formulation was calculated to be 250 ppm, and the amount of boron in the formulation was calculated to be about 28 ppm.

Formulation No. 3 (20% NaCl, 1% Guar Gum, 500 Ppm Sodium Borate)

An amount of 2.0 g of a solution containing 2.5 wt% sodium borate in water was added to 100 g of Formulation No. 1. The resulting sample was hand-mixed with a spatula for at least 30 seconds and allowed to equilibrate for 48 hours before testing of the resulting formulation. The amount of sodium borate in the formulation was calculated to be 500 ppm, and the amount of boron in the formulation was calculated to be about 57 ppm.

Formulation No. 4 (20% NaCl, 1% Guar Gum, 750 Ppm Sodium Borate)

An amount of 3.0 g of a solution containing 2.5 wt% sodium borate in water was added to 100 g of Formulation No. 1. The resulting sample was hand-mixed with a spatula for at least 30 seconds and allowed to equilibrate for 48 hours before testing of the resulting formulation. The amount of sodium borate in the formulation was calculated to be 750 ppm, and the amount of boron in the formulation was calculated to be about 85 ppm.

Formulation No. 5 (20% NaCl, 1% Guar Gum, 1500 Ppm Sodium Borate)

An amount of 4.0 g of a solution containing 2.5 wt% sodium borate in water was added to 100 g of Formulation No. 1. The resulting sample was hand-mixed with a spatula for at least 30 seconds and allowed to equilibrate for 48 hours. An additional 2.0 g of the 2.5 wt% sodium borate solution was added for a total of 6.0 grams. The resulting sample was hand-mixed with a spatula for at least 30 seconds and allowed to equilibrate for 48 hours before testing of the resulting formulation. The amount of sodium borate in the formulation was calculated to be 1500 ppm, and the amount of boron in the formulation was calculated to be about 170 ppm.

Formulation No. 6 (20% NaCl, 2% Locust Bean Gum)

An amount of 2.0 g of locust bean gum was slowly added into 98.0 g of 20 wt% NaCl solution using an IKA RW-20 digital overhead mixer with a 2-inch propeller mixing blade set at 300 rpm. The resulting sample was allowed to equilibrate and for bubbles to disperse for at least 48 hours before testing of the resulting formulation.

Formulation No. 7 (20% NaCl, 2% Locust Bean Gum, 250 Ppm Sodium Borate)

An amount of 1.0 g of a solution containing 2.5 wt% sodium borate in water was added to 99 g of Formulation No. 6. The resulting sample was hand-mixed with a spatula for at least 30 seconds and allowed to equilibrate for 48 hours before testing of the resulting formulation. The amount of sodium borate in the formulation was calculated to be 250 ppm, and the amount of boron in the formulation was calculated to be about 28 ppm.

Formulation No. 8 (20% NaCl, 2% Locust Bean Gum, 750 Ppm Sodium Borate)

An amount of 2.0 g of locust bean gum was slowly added into 98.0 g of 20 wt% NaCl solution using an IKA RW-20 digital overhead mixer with a 2-inch propeller mixing blade set at 300 rpm. The resulting sample was allowed to equilibrate and for bubbles to disperse for at least 48 hours. An amount of 3.0 g of a solution containing 2.5 wt% sodium borate in water was then added to the sample. The resulting sample was hand-mixed with a spatula for at least 30 seconds and allowed to equilibrate for 48 hours before testing of the resulting formulation. The amount of sodium borate in the formulation was calculated to be 750 ppm, and the amount of boron in the formulation was calculated to be about 85 ppm.

Formulation No. 9 (20% NaCl, 1% Xanthan Gum)

An amount of 2.0 g of xanthan gum was slowly added to 200.0 g of 20% NaCl solution that was being stirred at 300 rpm using an IKA RW-20 digital overhead mixer with a 4-inch propeller mixing blade. The resulting sample was allowed to equilibrate and for bubbles to disperse for at least 48 hours before testing of the resulting formulation.

Formulation No. 10 (20% NaCl, 1% Xanthan Gum, 375 Ppm Borate)

An amount of 3.0 g of a solution containing 2.5 wt% sodium borate in water was added to 200 g of Formulation No. 9. The resulting sample was hand-mixed with a spatula for at least 30 seconds and allowed to equilibrate for 48 hours before testing of the resulting formulation. The amount of sodium borate in the formulation was calculated to be 375 ppm, and the amount of boron in the formulation was calculated to be about 42 ppm.

Formulation No. 11 (20% NaCl, 0.5% Xanthan Gum, 0.5% Guar Gum, 500 Ppm Borate)

An amount of 0.5 g of guar gum and an amount of 0.5 g of xanthan gum were slowly added to 99.0 g of 20% NaCl solution that was being stirred at 300 rpm using an IKA RW-20 digital overhead mixer with a 2-inch propeller mixing blade. The resulting sample was allowed to equilibrate and for bubbles to disperse for at least 48 hours. Following equilibration, an amount of 2.0 g of 2.5% sodium borate solution was added slowly to the sample while being hand-mixed with a spatula for at least 30 seconds. The resulting sample was allowed to equilibrate for at least 48 hours before testing of the resulting formulation. The amount of sodium borate in the formulation was calculated to be 500 ppm, and the amount of boron in the formulation was calculated to be about 57 ppm.

Formulation No. 12 (20% NaCl, 0.5% Xanthan Gum, 0.5% Locust Bean Gum, 500 Ppm Borate)

An amount of 0.5 g of xanthan gum and an amount of 0.5 g of locust bean gum were slowly added to an amount of 99.0 g of 20% NaCl solution that was being stirred at 300 rpm using an IKA RW-20 digital overhead mixer with a 2-inch propeller mixing blade. The resulting sample was allowed to equilibrate and for bubbles to disperse for at least 48 hours. Following equilibration, an amount of 2.0 g of 2.5% sodium borate solution was added slowly while being hand-mixed with a spatula for at least 30 seconds. The resulting sample was allowed to equilibrate for at least 48 hours before testing of the resulting formulation. The amount of sodium borate in the formulation was calculated to be 500 ppm, and the amount of boron in the formulation was calculated to be about 57 ppm.

Formulation No. 13 (20% NaCl, 0.5% Guar Gum, 0.5% Locust Bean Gum, 500 Ppm Borate An amount of 0.5 g of guar gum and an amount of 0.5 g of locust bean gum were slowly added to an amount of 99.0 g of 20% NaCl solution that was being stirred at 300 rpm using an IKA RW-20 digital overhead mixer with a 2-inch propeller mixing blade. The resulting sample was allowed to equilibrate and for bubbles to disperse for at least 48 hours. Following equilibration, an amount of 2.0 g of 2.5% sodium borate solution was added slowly to the sample while being hand-mixed with a spatula for at least 30 seconds. The sample was allowed to equilibrate for at least 48 hours before testing of the resulting formulation. The amount of sodium borate in the formulation was calculated to be 500 ppm, and the amount of boron in the formulation was calculated to be about 57 ppm.

For each of the above formulations, the weight ratio of elemental boron (as opposed to the boron-containing compound) to thickener was determined. In addition, the above-described corrugate contact test was performed for each such formulation. The results are set forth below in Table III.

TABLE III

| | Description | Corrugate Contact Test Physical Appearance | Value | Comment | Weight Ratio of Boron: Thickener (Calculated) |
|---|---|---|---|---|---|
| 1 | 20% NaCl, 1% Guar Gum | Low viscosity liquid | 1 | Unsuitable for the application due to liquid flow characteristics. | N/A |
| 2 | 20% NaCl, 1% Guar Gum, 250 ppm borate (28 ppm boron) | Viscous, slightly elastic liquid | 1 | Comparable to KOOLIT® 524-ST. Unsuitable for the application due to liquid flow characteristics. | 1:357 |
| 3 | 20% NaCl, 1% Guar Gum, 500 ppm borate (57 ppm boron) | Soft, elastic gel | 5 | Superior performance; ideal for the application. | 1:175 |
| 4 | 20% NaCl, 1% Guar Gum, 750 ppm borate (85 ppm boron) | Elastic gel | 5 | Superior performance; ideal for the application. | 1:118 |
| 5 | 20% NaCl, 1% Guar Gum, 1500 ppm borate (170 ppm boron) | Elastic, brittle gel | 3 | Improved performance over commercial products: acceptable for the application. | 1:59 |
| 6 | 20% NaCl, 2% Locust Bean Gum | Viscous liquid | 1 | Unsuitable for the application due to liquid flow characteristics. | N/A |
| 7 | 20% NaCl, 2% Locust Bean Gum, 250 ppm borate (28 ppm boron) | Viscous liquid | 1 | Unsuitable for the application due to liquid flow characteristics. | 1:714 |
| 8 | 20% NaCl, 2% Locust Bean Gum, 750 ppm borate (85 ppm boron) | Elastic gel | 4 | Good performance; well suited to the application. | 1:235 |
| 9 | 20% NaCl, 1% Xanthan Gum | Low viscosity liquid | 1 | Unsuitable for the application due to liquid flow characteristics. | N/A |
| 10 | 20% NaCl, 1% Xanthan Gum, 375 ppm borate (42 ppm boron) | Elastic, brittle gel | 3 | Improved performance over commercial products: acceptable for the application. | 1:238 |
| 11 | 20% NaCl, 0.5% Xanthan Gum, 0.5% Guar Gum, 500 ppm borate (57 ppm boron) | Elastic, brittle gel | 3 | Improved performance over commercial products: acceptable for the application. | 1:175 |
| 12 | 20% NaCl, 0.5% Xanthan Gum, 0.5% Locust Bean Gum, 500 ppm borate (57 ppm boron) | Elastic, brittle gel | 3 | Improved performance over commercial products: acceptable for the application. | 1:175 |
| 13 | 20% NaCl, 0.5% Guar Gum, 0.5% Locust Bean Gum, 500 ppm borate (57 ppm boron) | Soft, elastic gel | 5 | Superior performance; ideal for the application. | 1:175 |

As can be seen from Table III, where the boron to thickener weight ratio was in the range of about 1:250 to 1:50, the corresponding gel exhibited acceptable results in the corrugate contact test (i.e., a value of at least 3). In particular, for some of the gel compositions in which the boron to thickener weight ratio was in the range of about 1:175 to 1:120, the corresponding gel exhibited particularly good results in the corrugate contact test (i.e., a value of 5). This is in contrast with the compositions of Example 1, in which the boron to thickener weight ratio was in the range of about 1:600 to 1:400 (more specifically, 1:574 for U-TEK® 599 and 1:412 for KOOLIT® 524-ST, which had unacceptable values of 2 and 1, respectively, in the corrugate contact test), and also is in contrast with Formulation Nos. 2 and 7 of Example 3, in which the boron to thickener weight ratio was in the range of about 1:700 to 1:350 (more specifically, 1:357 for Formulation No. 2 and 1:714 for Formulation No. 7, both of which had unacceptable values of 1 in the corrugate contact test).

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A gel composition suitable for use in a thermal exchange implement, the gel composition comprising:
   (a) a phase-change material, wherein the phase-change material comprises an aqueous salt solution and wherein the aqueous salt solution comprises about 20 wt% of at least one salt;
   (b) a cross-linkable thickener, wherein the cross-linkable thickener is compatible with the phase-change material, wherein the cross-linkable thickener comprises one or more cross-linkable hydroxyl groups, and wherein the cross-linkable thickener constitutes about 1-2.5 wt% of the gel composition; and
   (c) a cross-linker for the one or more cross-linkable hydroxyl groups, wherein the cross-linker comprises a boron-containing cross-linker and wherein boron constitutes about 40 to 200 ppm, by weight, of the gel composition.

2. The gel composition as claimed in claim 1 wherein boron constitutes about 50 to 170 ppm, by weight, of the gel composition.

3. The gel composition as claimed in claim 2 wherein boron constitutes about 55 to 85 ppm, by weight, of the gel composition.

4. The gel composition as claimed in claim 1 wherein the cross-linkable thickener comprises a polysaccharide.

5. The gel composition as claimed in claim 4 wherein the cross-linkable thickener comprises a galactomannan.

6. The gel composition as claimed in claim 5 wherein the galactomannan comprises at least one of the group consisting of fenugreek gum, guar gum, tara gum, locust bean gum, and cassia gum.

7. The gel composition as claimed in claim 6 wherein the galactomannan comprises at least one member of the group consisting of guar gum and locust bean gum.

8. The gel composition as claimed in claim 7 wherein the galactomannan comprises guar gum.

9. The gel composition as claimed in claim 7 wherein the galactomannan comprises locust bean gum.

10. The gel composition as claimed in claim 5 wherein the cross-linkable thickener further comprises xanthan gum.

11. The gel composition as claimed in claim 1 wherein the boron-containing cross-linker comprises sodium borate.

12. The gel composition as claimed in claim 11 wherein sodium borate constitutes about 375 to 1500 ppm of the gel composition.

13. The gel composition as claimed in claim 12 wherein sodium borate constitutes about 500 to 750 ppm of the gel composition.

14. The gel composition as claimed in claim 1 wherein the at least one salt of the aqueous salt solution is selected from the group consisting of sodium chloride, potassium chloride, and calcium chloride.

15. The gel composition as claimed in claim 1 wherein the aqueous salt solution constitutes at least 90% by weight of the gel composition.

16. The gel composition as claimed in claim 15 wherein the aqueous salt solution constitutes at least 95% by weight of the gel composition.

17. The gel composition as claimed in claim 16 wherein the aqueous salt solution constitutes at least 97% by weight of the gel composition.

18. The gel composition as claimed in claim 1 wherein the gel composition is frozen.

19. A thermal exchange implement suitable for use in maintaining a temperature-sensitive material within a desired temperature range, the thermal exchange implement comprising:
   (a) a thermal exchange implement container; and
   (b) a quantity of the gel composition of claim 1 disposed within the thermal exchange implement container.

20. The thermal exchange implement as claimed in claim 19 wherein the thermal exchange implement container is a flexible pouch.

21. The thermal exchange implement as claimed in claim 19 wherein the at least one salt of the aqueous salt solution is selected from the group consisting of sodium chloride, potassium chloride, and calcium chloride, wherein the cross-linkable thickener is guar gum and constitutes about 1 wt% of the gel composition, and wherein the boron-containing cross-linker is sodium borate and constitutes about 375 to 1500 ppm of the gel composition.

22. The thermal exchange implement as claimed in claim 19 wherein the gel composition is frozen.

* * * * *